United States Patent [19]

Sable

[11] 4,248,488
[45] Feb. 3, 1981

[54] QUICK DISCONNECT BEARING MOUNT FOR CONSTRUCTION MACHINERY

[75] Inventor: Harvey J. Sable, Hudson, Ohio

[73] Assignee: Rotek Incorporated, Aurora, Ohio

[21] Appl. No.: 10,006

[22] Filed: Feb. 7, 1979

[51] Int. Cl.³ .............................................. B66C 23/84
[52] U.S. Cl. .................................. 308/220; 212/181; 277/136; 403/157
[58] Field of Search ............... 308/220, 221, 222, 223, 308/236; 212/70; 277/136, 138; 285/DIG. 21, 18; 403/157

[56] References Cited

U.S. PATENT DOCUMENTS

| 3,075,614 | 1/1963 | Grundon | 308/221 X |
| 3,525,448 | 8/1970 | Bauer | 403/157 |
| 3,726,418 | 10/1973 | Short | 212/69 |
| 3,847,492 | 11/1974 | Kennicutt et al. | 403/157 |
| 3,874,706 | 4/1975 | Arnold | 285/DIG. 21 |
| 4,105,347 | 8/1978 | Gossage | 403/327 |

*Primary Examiner*—William D. Martin, Jr.

[57] ABSTRACT

A material handling apparatus includes a base, an upper structure and a bearing for supporting the upper structure on the base for rotation about an axis. The bearing transmits radial, axial and moment forces from the upper structure to the base and has a first race connected to the upper structure and a second race movable as a unit with the first race. Means are provided for removably connecting as a unit the upper structure and bearing from the base and comprises a locking member, a lug and means for receiving the lug. Either the lug or the retaining means is fixed to the second race of the bearing and extends downwardly therefrom and the other is fixed to the bed. The retaining means has a pair of retainer portions which are spaced from each other to closely receive the lug therebetween. The locking member is slidably received in an opening through the lug and is removably received in apertures in the retaining portions. Means are provided for releasably restraining the locking member from axial movement with respect to the retainer portions.

16 Claims, 8 Drawing Figures

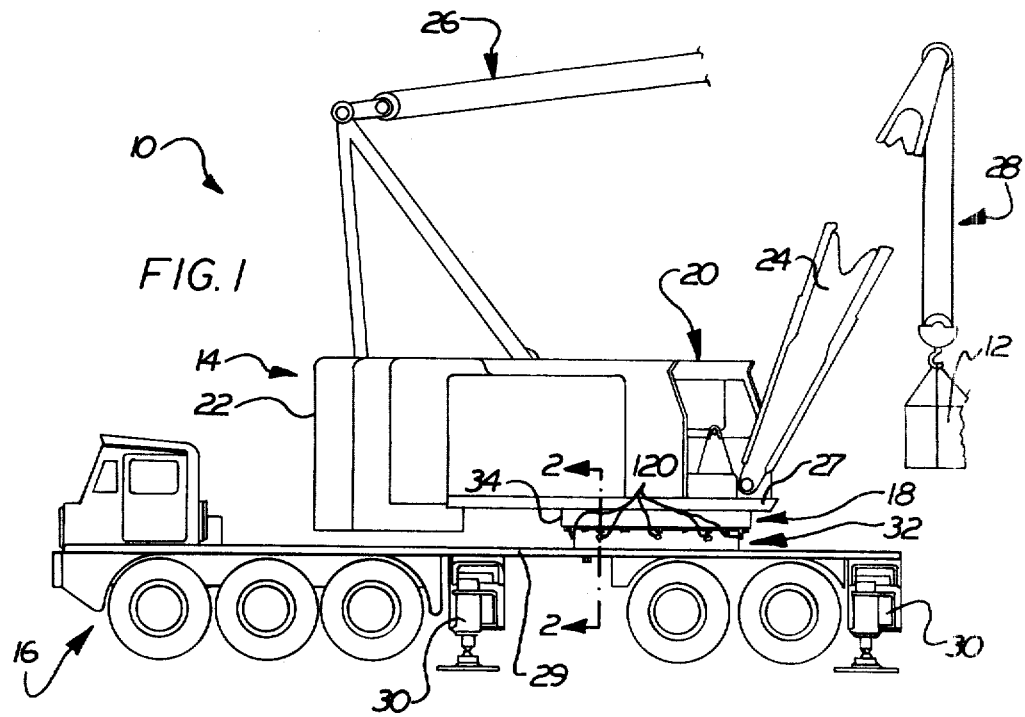
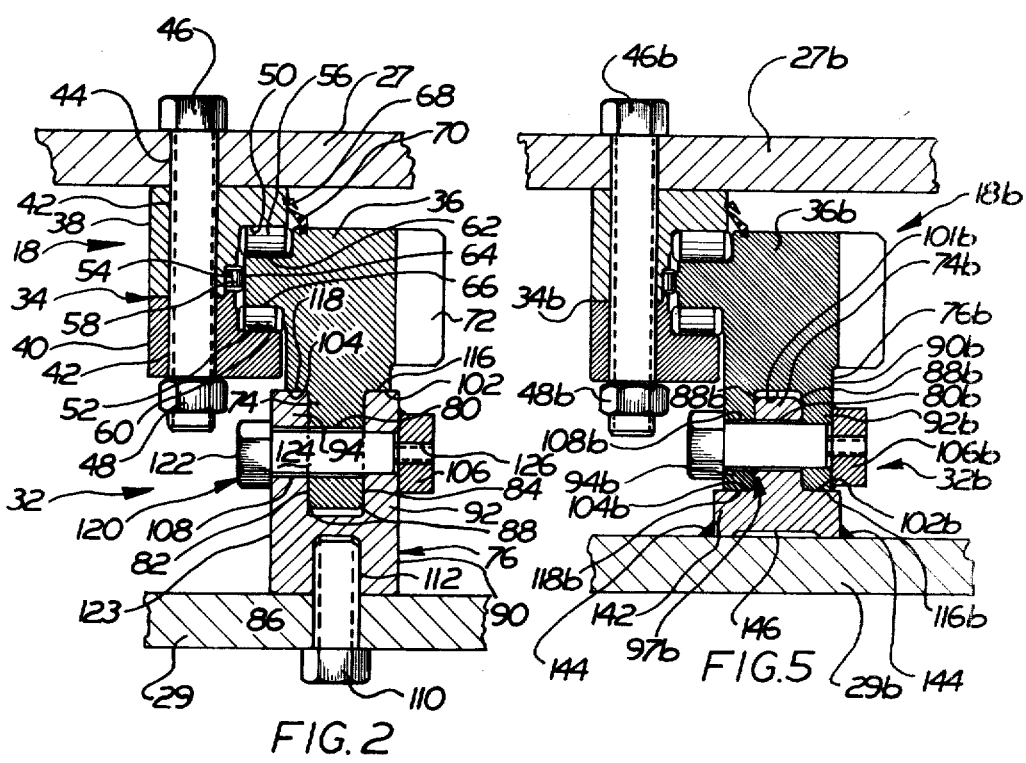

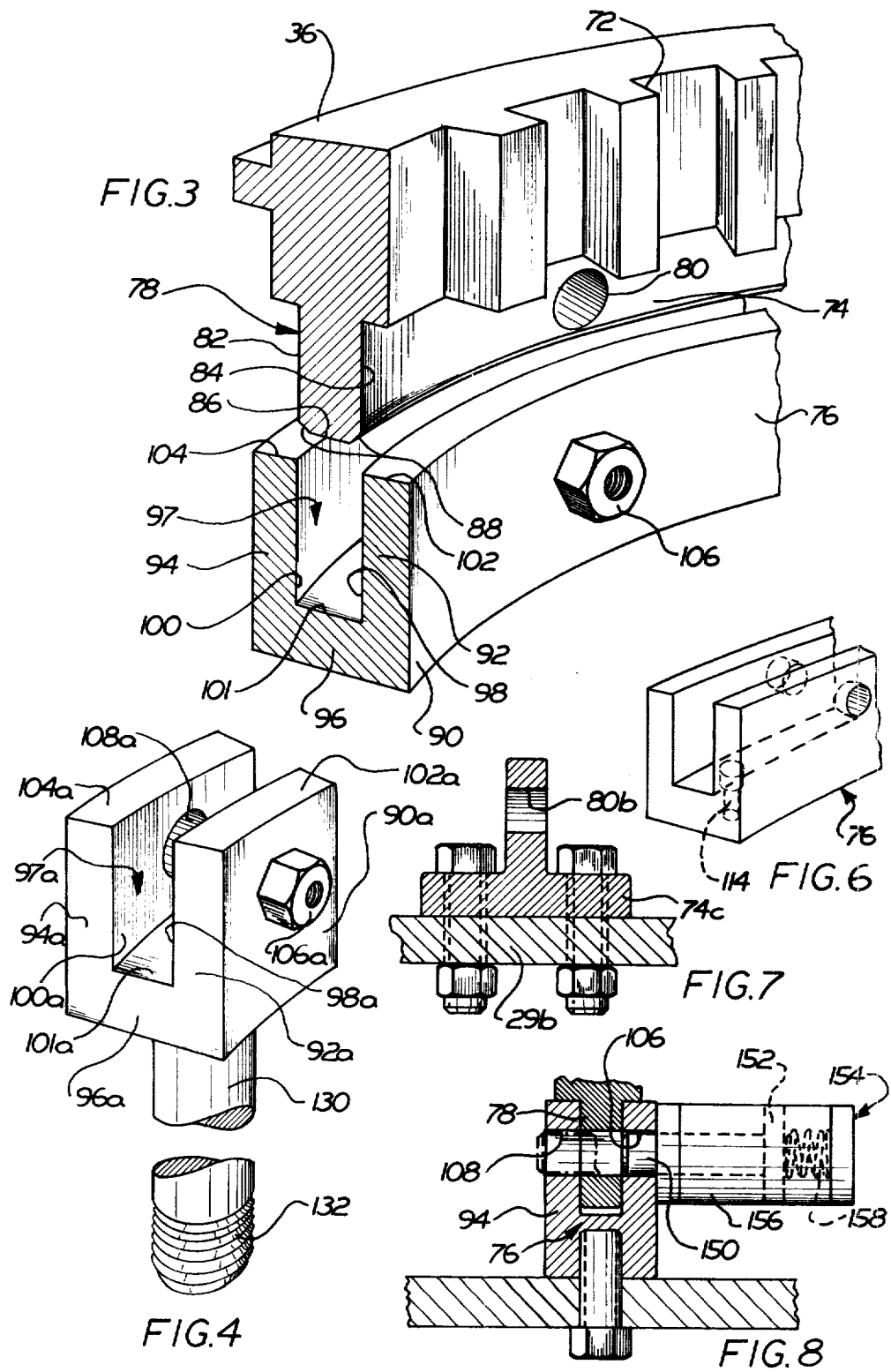

ized to a material handling apparatus and more particularly to a material handling apparatus having a rotatable upper structure which is releasably connected to a base and to a bearing mounted for high load bearings.

QUICK DISCONNECT BEARING MOUNT FOR CONSTRUCTION MACHINERY

BACKGROUND OF THE INVENTION

This invention relates generally to a material handling apparatus and more particularly to a material handling apparatus having a rotatable upper structure which is releasably connected to a base and to a bearing mounted for high load bearings.

Cranes and other material handling vehicles commonly have rotatable booms and operator's cabs, generally referred to as the bearing is provided for supporting the upper structure on the base while providing for rotation about a vertical axis and transmitting axial, radial and moment forces from the upper structure to the base.

It is highly desirable to be able to quickly connect and disconnect the upper structure with respect to the base. By disconnecting the upper structure from the base, the bearing may be readily repaired, maintained or replaced. The need to separate the upper structure from the base frequently occurs when the crane must be shipped over highways to a new job site. Depending on the size of the crane or other machine with a rotatable upper structure, highway axle load limits might otherwise be exceeded. In addition, difficulty may be encountered clearing low bridges necessitating taking an undesirable route to the job site. By disconnecting the upper structure from the base, which in some cases may be a mobile carrier, the upper structure may be shipped on a flat bed truck while the stripped mobile carrier moves under its own power.

Several arrangements for releasably mounting the upper structure including the bearing to the base are known. Most commonly the upper structure is connected to the bed by use of bolts which are torqued to provide high clamping forces on the bearing raceways. A connection of this type is shown in Mork et al, U.S. Pat. No. 3,125,226. These bolts must be pre-loaded by torquing to a uniformly high value. High and uniform tensile forces in a large number of camping bolts necessitate considerable labor and a substantial amount of time to connect or disconnect the upper structure to and from the base. Yet another problem with this design is that bolts in tension are susceptible to fatigue failure, particularly as bolt preload is lost through embedment and lack of maintenance.

The upper structure has also been connected to the base by using bolts (see Manly U.S. Pat. No. 2,313,084) or rollers whose axis extends radially of the swing axis of the upper structure, problems arise with these structures. In the case of bolts as in the Manly patent, a large number of bolts are required as compared to the use of tensioned bolts extending parallel to the axis as shown in the Mork patent. The shear strength of steel bolts used in a single shear arrangement is less than its tensile strength based on commonly used yield stress criteria. In addition, the bolts as used in the Manly patent have a tendency to bend and cock, making disconnection of any bent or cocked bolts or pins difficult. The bending stresses introduced by this action further reduce the usable load capacity of the connection.

Yet another prior art design is shown in Short, U.S. Pat. No. 3,726,418 which uses a number of tangs which are extensions of the inner race of the bearing. The tangs are received in corresponding openings in the carrier. A tapered wedge block assembly is driven to a slot in each of the tangs to connect the upper structure and the bed or carrier. Such a design is not readily and easily disconnectable and is quite expensive to build. The wedge block assembly is accessible only from the underside of the carrier thus increasing the difficulty of connecting and disconnecting the upper structure with respect to the carrier.

To obtain an easy disconnect of the upper structure and bearing, various designs have been proposed utilizing circumferential clamps between flanges on the bearing and bed including hydraulically operated clamps. Such arrangements have problems in securing the parts tightly and providing room for the clamp operation and are generally expensive and complicated.

It may be understood that a quick connect device for interconnecting an upper structure to a carrier or base allowing for ease of alignment both in transverse placement and angular orientation is desirable. It is also desirable that a quick connect device be low in cost and the fasteners be standard in size and minimum in number. It is also desirable that the fasteners are not required to have a high pre-load torque which requires uniform and sequential loading of the bolts as well as making it difficult to disconnect. Also, eliminating the need for bolt preload decreases the amount of labor and time involved in the connection or disconnection process. It is also desirable that the quick connect design provides for long fatigue life of the parts effecting the quick disconnect device.

SUMMARY OF THE INVENTION

The present invention provides the above-described desirable features with a new and improved quick disconnect coupling assembly for releasably connecting a rotatable upper structure with a base. A bearing is provided to allow for rotation of the upper structure on the base about a vertical axis and transmits axial, radial and moment forces from the upper structure to the base. The connection of the bearing to the base frequently must also transmit rotational forces in the plane of the bearing to the bed. This occurs when one race member of the bearing also functions as a ring gear for rotating the upper structure. The bearing has a first race member which may be connected to the upper structure and a second race member movable as a unit with the first race member. The quick disconnect coupling assembly of the present invention includes a lug and a retaining means for receiving the lug. Either the lug or retaining means is fixed to the second race member and the other is fixed to the base if the first race member is connected to the upper structure. The retaining means includes a pair of retainer portions spaced from each other to closely receive the lug therebetween. The quick disconnect coupling assembly includes a bolt or other locking member which is slidable in an opening through the lug and is removably received in apertures in the retainer portions. The quick disconnect device also includes means for releasably restraining axial movement of the locking member with respect to the retainer portions. The bolt or other locking member need not be loaded to high tensile loads, thus simplifying connection and disconnection.

When a force is exerted on the upper structure, for example when a crane picks up a load, a corresponding force is trasmitted from the upper structure to the base through the locking members. The structure of the present invention places the bolt or other locking member in "double" shear when transmitting forces between the lug and the retainer portions. This substantially increases the amount of load which may be transmitted by the locking member and thereby provides for minimizing the number of locking members required and does not require a preloading of a bolt or other locking members thus simplifying connection to or disconnection from the base.

It should be understood that the locking member may be a threaded fastener such as a standard bolt and thereby substantially minimizes the costs of the quick disconnect device of the present invention. When bolts are used as locking members in the present invention, they need not be torqued to a high level as required in the single shear arrangement but rather need only be secured sufficiently so that they will resist backing out of the opening through the lug and the apertures in the retainer portions. By placing the bolts in double shear, they are less susceptible to fatigue failure than when in tension or in single shear.

The present invention also contemplates the use of a slidable pin as the locking member and such pins may be used with hydraulic means, for example, individual cylinders or hydraulically operated mechanisms for moving the pins into and out of their locking position.

The bearing mounting hereof (quick disconnect device) resist the bending or cocking of the locking members under high bearing loads so that the locking members may be readily moved between mount connected and mount unconnected positions thereby providing a mounting suitable for use in cranes and other apparatus for connecting a bearing for transmitting high loads, particularly, high axial, radial and moment loads, between to relative rotatable parts while enabling easy separation of the parts.

In cranes and the like, when it is desirable to connect or disconnect the upper structure from the base, the present invention provides for the use of standard tools. The present invention also permits the locking members to be located so as to be connected or disconnected from the outside of the cranes or the like so that a workman is able to more quickly connect or disconnect the upper structure from the base.

BRIEF DESCRIPTION OF THE DRAWINGS

FIG. 1 is a schematic illustration of a material handling operation having a rotatable upper structure which is connected to a base by a quick disconnect coupling device constructed in accordance with the present invention;

FIG. 2 is an enlarged sectional view of a portion of the quick disconnect coupling assembly taken generally along line 2—2 of FIG. 1, illustrating the lug and retaining means of the quick disconnect device;

FIG. 3 is the perspective view of a portion of the lug and retaining means;

FIG. 4 is a perspective view illustrating a second embodiment of the retaining means of the present invention;

FIG. 5 is a sectional view, generally similar to FIG. 2, illustrating yet another embodiment of the present invention;

FIG. 6 is a view of a modified lug means;

FIG. 7 is a perspective view of another embodiment of the retaining means; and

FIG. 8 is a fragmentary sectional view with part in elevation of a modified version of the structure shown in FIG. 2.

DETAILED DESCRIPTION OF THE INVENTION

The description of the present invention will proceed the invention embodied in a crane in which the invention is particularly useful. However, it will be understood that the invention is applicable to other apparatus, e.g., a material handling apparatus which has a bearing mounting or coupling for transmitting high loads, particularly axial, radial and moment loads, between structures which are to be easily separated.

Referring now more specifically to the drawings and particularly FIG. 1, the invention is illustrated as embodied in a material handling apparatus in the form of a crane 10. The crane 10 includes an upper structure, generally indicated at 14, a base structure or carrier, generally indicated at 16, and a bearing 18 for supporting the upper structure 14 on the carrier.

The carrier 16 is of any known design and as shown in FIG. 1 is a mobile truck which is capable of moving under its own power so that it may be self-transporting from one job site to the other. The carrier has a bed 29 for supporting the upper structure 14 as will hereinafter be more fully described. The carrier 16 is also provided with lateral and vertically extendible outriggers, generally indicated at 30, for stabilizing the crane 10 in operation to increase the tipping circle. The outriggers 30 may be of any conventional design well known to those skilled in the art.

The upper structure 14 of the crane 10 may be of any construction well known to those skilled in the art and as shown in FIG. 1 includes an operator's cab 20 with counterbalancing weights 22 attached to the bottom 27. The crane upper structure 14 also includes a boom 24, only a portion of which is shown, pivotally mounted to the operator's cab 20 about a horizontal axis to raise and lower the boom. The boom 24 may be elevated by any appropriate known means such as the cable assembly 26. A cable assembly 28 is also provided for raising and lowering the load 12 with respect to the boom 24. The cable assemblies 26 and 28 are driven by any means known to those skilled in the art. Accordingly, the load can be raised or lowered in a vertical direction by the cable assembly 28 and toward and away from the crane 10 by rotation of the boom 24 by the cable assembly 26.

The bearing 18 provides for rotation of the upper structure 14 with respect to the carrier 16. By rotation of the upper structure 14, the load 12 may be moved to another position around the crane in a known manner. The bearing 18 transmits axial, radial and moment forces from the upper structure 14 to the carrier 16.

When it is necessary to move the crane 10 from one location to the other, it is desirable to separate the upper structure 14 from the mobile base 16 so that the crane may be transported to a new job site.

The bearing mounting for removably connecting the upper structure 14 and the bearing 18 to the base 16 is generally indicated at 32. The bearing mounting, or disconnect device 32, allows the upper structure 14 and the bearing 18 to be readily connected and disconnected to the carrier 16 with the desirable features herein described.

When the upper structure 14 is connected to the carrier 16, the outer race 34 of the bearing 18 is connected to the bottom 27 of the upper structure and the inner race 26 of the bearing is connected to the bed 29 of the carrier by the quick disconnect device 32, as seen in FIGS. 1 and 2. It should be understood that it is contemplated that either race may be secured to the upper structure 14 or the base 16 and the other race secured to the other by the quick disconnect device 32. It should be further understood that the bearing 18 may be of any known construction preferably capable of transmitting axial, radial and moment forces.

The outer race 34 of the bearing 18 shown in FIGS. 1 and 2 includes a circular upper outer race member 38 and a circular lower outer race member 40 as seen in FIGS. 1 and 2. The typical cross-sections of the circular outer race members 38, 40 are shown in FIG. 2. Each of the outer race members 38, 40 have vertical openings 42 in alignment with each other and spaced about the periphery of the outer race members and the bottom 27 of the upper structure 14 has a series of apertures 44 therein which are alignable with the apertures 42. Threaded bolts 46 are provided and are received in the apertures 42, 44. The bolts 46 are secured by means of the threaded fasteners or nuts 48. The bolts 46 are tightened so that the outer race members 38, 40 are securely attached to the bottom 27 and need not be loosened or tightened during operation of the quick disconnect device 32 of the present invention. It should be clearly understood that any fastening means may be used to secure the outer race 34 to the bottom.

The bearing 18 is capable of transmitting axial, radial and moment forces between the outer race 34 and the inner race 36. The circular upper outer race member 38 has an upper outer race surface 50 and a side outer race surface 54 while the circular lower outer race member 40 has a lower outer race surface 52. The bearing 18 also includes a series of roller bearings 56, 68 and 60 which transmit the forces exerted on the upper structure 14 to the inner race member 36.

For example, when a downward force is exerted on the surface 50, that force is transmitted through the bearing 56 to the upper inner bearing surface 62 of the inner race 36. Upward forces on the outer race 34 are transmitted from the lower outer race surface 52 through the bearing member 60 to the lower inner bearing race surface 66 of the inner bearing 36. Radial forces on the outer race 34 are transmitted from the side outer race surface 54 through the bearing 53 to the side inner race surface 64.

The bearing 18 includes lubrication seals 68, 70 which are secured to the upper outer race member 38 and the inner race member 36 respectively to retain a lubricant on the bearing surfaces 50, 52, 54, 62, 64, 66 and ball bearings 56, 58 and 60.

To rotate the upper structure 14 with respect to the carrier 16, a motor with a gear train (not shown) is secured to the upper structure and a pinion on the output shaft of the gear train meshes with the gear teeth, generally indicated at 72 in FIGS. 2 and 3, on the inner race member 36. When the upper structure 14 is connected to the carrier 16, the inner race member 36 and consequently the gear teeth 72 are secured to the carrier 16 and upon relative movement of the gears, the upper structure 14 is rotated in a known manner.

The illustrated quick disconnect device 32 of the present invention releasably connects the inner race 36 to the base 16. As seen in FIGS. 2 and 3, the quick disconnect device 32 includes lugs 74 on the inner race member 36 and retaining means 76 for receiving the lugs. The retaining means 76 is secured to the bed 29 of the carrier 16.

As described above, the inner race member 36 is circular and has a complementary circular lug portion 78 extending downwardly toward the bed 29 of the carrier 16. The lug portion 78 is preferably formed integrally with the inner race member 36. For purposes of illustrating the present invention, the lug portion 78 of the inner race member 36 has a series of openings 80 therethrough spaced about the circumference of the lug portion 78 as seen in FIG. 3. For ease of description, it should be understood that the lug portion 78 may or may not be continuous and comprises a series of lugs 74, each lug 74 comprising the area of the lug portion 78 adjacent to each of the openings 80. The openings 80 have a generally circular cross-section and have an axis preferably passing through the center of rotation of the bearing 18. For ease of description, only one of the lugs 74 will be hereinafter described.

The lug 74 has an outer and an inner side surface 82, 84 respectively which are spaced from each other a predetermined distance. The surfaces 82, 84 are substantially concentric. The lug 74 includes a lower or bottom surface 86 between the outer and inner side surfaces 82, 84. The lug 74 also includes chamfer portions 88 which are at an angle with respect to and connect the sides 82, 84 and the lower surface 86.

The retaining means 76 of the quick disconnect device 32 releasably secures the lug 74 to the bed 29 of the carrier 16. The retaining means 76 includes a bearing support member 90 having a generally channel shaped cross-sectional configuration with a bottom portion 96 and upwardly extending inner and outer portions 92, 94 respectively.

The surfaces 98, 100 of the retainer portions 92, 94 are spaced from each other a predetermined distance so that the lug 74 is slidably received therein with the surfaces 82, 84 of the lug in contact with the surfaces 98, 100 of the retainer portions 94, 92 respectively. Since the retainer portions 92, 94 are secured to the bed 29, the retainer portions restrain the movement of the received lug 74.

The upwardly extending portions 92 and 94 may or may not be continuous but have a series of spaced apertures 106, 108 extending through the upwardly extending portions 92, 94 respectively. The apertures 106, 108 are circular in cross-section and have an axis which preferably passes through the axis of rotation of the bearing 18. The segments of the upwardly extending portion 92 adjacent to each of the apertures 106 provides one of a pair of retainer portions and the other of the pair being a segment of the upwardly extending member 94 adjacent to the apertures 108 on the upwardly extending portion 94 and in alignment with a corresponding aperture 106. For ease of description, only one pair of retainer portions will be hereinafter described and it is to be understood that a number of such retainer portions are spaced around the member 90.

The retainer member 90 is secured to the bed 29 of the carrier 16 by a number of threaded bolts 110 which as seen in FIG. 2 extend through the bed 29 to thread into corresponding threaded openings 112 in the bottom of the retainer member 90. It should be understood that there are sufficient threaded fasteners 110 so that the retainer ring member 90 is properly secured to the bed 29. FIG. 6 illustrates a modified segmented channel-shaped retainer member 90 which may be bolted to the bed by bolts which are received in counterbored apertures 114 in the bottom of the channel and which extends from this bottom of the member for fastening to the bed.

When it is desirable to secured the upper structure 14 to the carrier 16, the lugs 74 on the inner race 36 are positioned above the slot 98 in their complementary pairs of retainer portions 92, 94. The upper structure 14 and consequently the inner race member 36 which is attached thereto is lowered so that the lugs 74 are received in the channels 97 defined by the retainer portions 92, 94. As the lugs 74 are lowered, the chamfer portions 88 thereof contact the retainer portions 92, 94 and guide the lugs into a position between the retainer portions. The lugs 74 continue to move in a downward direction until the apertures 80 in the lugs 74 are in alignment with apertures 106, 108 in the retainer portions 92, 94 respectively. In this connecting position, as seen in FIG. 2, lower surfaces 116 and 118 on the inner race member adjacent the top of the lug portion 78 are in contact with the upper surfaces 102, 104 of the retainer portions 92, 94 to support the upper works on the bed. Each lug 74 may be viewed as having an enlarged base portion integral with the inner race member which provides the support surfaces 116, 118.

To secure the lug 74 to the retainer portions 92, 94, the bearing mounting as quick disconnect device 32 includes locking members such as the bolts or shoulder screws 120. The bolt 120 has a head 122, a shank 124 and a threaded portion 126.

The bolt 120 is preferably a shoulder screw as shown in the drawings and is inserted through the aperture 108 in the retainer portion 94 and through the aperture 80 in the lug 74 until the smaller threaded portion 126 of the bolt reaches a nut 106 welded to the inside portion 92 into which it is then threaded. The axis of the bolt 120 is parallel to the plane of rotation of the bearing 18. By using a conventional wrench, the bolt 120 is rotated and tightened until the head 122 contacts the outer surface 123 of the retainer portion 94. The bolt 120 is then further tightened so that it will resist "backing out" of the apertures 108, 80 and 106. Accordingly, it can be seen that the head 122 of the bolt 120 and the nut 106 provides a means for releasably restraining axial movement of the bolt with respect to the retainer portions 92, 94. The use of a shoulder bolt provides full body bearing in the retainer portions 92, 94.

It should be understood that the threaded portion of a bolt may thread into the receiving aperture in the portion 92 if the latter is tapped. It should be further understood that the locking member 120 may be of many various designs and constructions that are slidably received in the apertures 108 and 80 and may be either slidably or threadedly engaged by the retainer portion 92. Similarly, suitable means may be used to releasably restrain axial movement of the locking member 120 with respect to the retainer portions 92, 94.

The fit between the bolt 120 and the apertures 108, 106 and 80 are such that when an upward force is exerted on the lug 74, the bolt 120 is placed in "double" shear. In such a double shear condition, the bolt 120 is placed in shear along a plane generally co-extensive with the surfaces 82, 100 of the lug 74 and retaining portion 94 respectively. The bolt 120 is also placed in shear along a plane generally co-extensive with the surfaces 84 and 98 of the lug 74 and retaining portion 92 respectively. These shear planes of the bolt 120 are substantially parallel to the axis of rotation of the bearing 18.

Due to the close fitting relationship of the bolt 120 in the apertures 106, 80 and 108 when an upward force is exerted on the lug 74, the bolt 120 is immediately placed in "double" shear. In addition, when a force is exerted upwardly on the lug 74, the bolt 120 is not able to cock or bend as in the prior art "single" shear designs. Any tendency of the bolt 120 to cock or bend is also compensated for by the shear strength of the bolt in the plane about which the bolt is tending to cock or bend. In addition, the effective strength of the bolt 120 as used in the present invention is more than twice as great as a bolt in single shear.

Due to the close fitting relationship between the surfaces 98, 100 on the retaining portions 92, 94 respectively and the surfaces 82, 84 on the lug 74, any lateral movement of the lug 74 and consequently the inner race 36 is restrained by the restraining portions 92, 94 of the retaining member 76.

When a downward force is exerted on the inner race 36, the lower load bearing surfaces 116, 118 on the inner race member transfer the force to the retaining members 92, 94 by contact with the surfaces 102, 104 respectively and the bolt 120 will assist in resisting any such downward force not carrier by the surfaces 102, 104. Any tendency of the inner race 36 to rotate with respect to the retaining means 76 is restrained by the bolt 120 in a like manner as described above in connection with an upward force exerted on the inner race 36.

It should be understood that the lug 74 and the retainer portion 78 may be of any construction which provides for their connection with a locking member so that forces are transmitted therebetween by placing the locking member in "double" shear as described above. One alternative design of the retaining member is shown in FIG. 4. For ease of description, similar parts of the retaining member shown in FIG. 4 will be indicated with the same numerals as used to describe the retainer member 90 in FIGS. 1, 2 and 3 followed by the suffix "a".

The retainer 90a has a generally channel-shaped cross-sectional configuration with a bottom portion 96a and upwardly extending inner and outer portions 92a and 94a respectively. The upwardly extending portions 92a and 94a have aligned apertures, aperture 108a appearing in FIG. 4. The aperture 108a is of a size so as to slidably receive a locking member therein and the bolt extends through the other aperture and threads into a nut 106a.

Surfaces 98a, 100a and 101a of the retainer member define the slot 97a into which a lug is closely received as described above in connection with the lug 74. The retainer portions 92a, 94a also have upper support surfaces 102a, 104a respectively for engaging the corresponding surfaces of lug means to provide for the transmission of downward forces.

To secure the retainer member 90a to a base, the retainer member has a downwardly extending shaft portion 130 with threads 132 on the lower end thereof. A nut is provided to threadedly engage threads 132 on the shaft 130 and is tightened against the base to rigidly secure the retainer member 90a to the base.

By providing a number of retainer members 90a positioned so that their respective lugs are closely received therein, the upper structure of a material handling apparatus may be secured to a base with a quick disconnect bearing mounting device of the present invention as described above in connection with FIGS. 1, 2 and 3. It should be clearly understood that other alternative designs may be used to secure the retainer member to the base.

It is also within the contemplation of the present invention that the retainer means be secured to one of the races of the bearing and the lugs to the base of the material handling apparatus. One such alternative design is shown in FIG. 5. For ease of description, similar parts of the apparatus shown in FIG. 5 corresponding to the parts described in connection with the apparatus shown in FIGS. 1, 2 and 3 will be designated with the same numerals followed by the suffix "b".

The quick disconnect bearing mounting device 32b of the present invention releasably connects the bearing 18b to the bed 29b so that the upper structure may be selectively connected or disconnected from the bed 29b. The bearing 18b has an inner and outer race 36b, 34b respectively. The outer race 34b is connected to the bottom 27 of the upper structure by means of the bolts 46b and nuts 48b.

The inner race 36b of the bearing 18b has a retainer member 90b attached thereto. The retainer 90b includes oppositely disposed retainer portions 92b, 94b spaced about the circumference of and secured to the inner race 36b. The retainer portions 92b, 94b and the surface 101b interconnecting the retainer portions form a slot 97b in which a complementary lug 74b of the lug member 140 is received in a close fitting relationship. The lug 74b has an enlarged surface portion 142 to provide support surfaces 102b, 104b. The retaining portions 92b, 94b have apertures 106b, 108b therein and the lug 74b has an aperture 80b therethrough.

When it is desirable to connect the inner race 36b to the bed 29b, the upper structure and consequently the inner race 36b is lowered downwardly and the chamfers 88b on the lugs 74b provide for alignment between the lugs and the retaining portions 92b, 94b. As the upper structure continues to be lowered, the support surfaces 102b, 104b on the retainer portions 92b, 94b respectively contact the support surfaces 116b, 118b respectively on the lug 140.

The bolt 120b is then slid through the openings 108b in the retainer portion 94b, the opening 108b in the lug 74b respectively, and the opening 106b in the retainer portion 92b, and is threaded into the nut 106b welded to the exterior of the inside retainer portion 92b. The bolt 120b is then tightened a sufficient amount so as to resist "backing out" from threaded engagement with the threaded apertures. The base portion 142 of the lug is secured to the bed 29b by any conventional means well known to those skilled in the art, such as the welds 144 or by bolts as illustrated in the lug member 74c shown in FIG. 7. The base portion 142 of the lug member (FIG. 5) has a cavity 146 therein to facilitate such welding.

FIG. 8 illustrates a modification of the present invention utilizing pins as locking members and individual hydraulic cylinders for actuating each pin in between a locking position and a clear position for connecting or disconnecting the lug portion to the retaining means.

In FIG. 7, retaining means 76 is as illustrated in the first described embodiment except the welded nut for receiving a threaded fastener has been eliminated and pin type locking elements substituted for the bolts. The locking element illustrated in FIG. 7 is a slidable pin 150 connected to a piston 152 of an individual hydraulic cylinder 154 and extends from the piston in the manner of a piston rod. Hydraulic fluid is introduced into the rod end 156 of the hydraulic cylinder to move the piston against a biasing spring 158 to actuate the pin 150 to a connecting position where the lug portion 78 may be connected to or removed from the retainer means 76.

The release of the hydraulic pressure in the piston allows the spring 158 to move the piston from a retracted or clear position extending only into the aperture 106 of the retaining means 76 to cause the pin to move into the receiving aperture of the lug portion 78 and into the aperture 108 in the retainer portion 94 of the retaining means. The use of sliding pins and individual hydraulic cylinders for each of the pins enables the locking members to be quickly withdrawn for purposes of disconnect as by the operation of a single hydraulic control member. The spring 158 will maintain the corresponding locking member in locking position during use of the machine. As will be noted, the hydraulic cylinders are preferably positioned on the inside of the retainer means 76 so as to be located below the slewing gear and may be bolted to the retainer portion 94 to extend generally toward the axis of the bearing.

It will be appreciated that hydraulically operated mechanical devices may also be arranged inside of the basically annular retainer means to move pins or the like in and out of the receiving apertures. Also, if desired, the hydraulic cylinders such as cylinder 152 could be placed on the outside of the retainer means but in this case, it may be desirable to use locating marks on the retainer means and the lug portion to obtain alignment of the apertures in the retaining means and the lug portion when connecting the mounting.

It should be understood that it is within the contemplation of this invention that either the lugs or the retainer member may be secured to one of the races of the bearing. Moreover, the annular retainer means may be a one piece member, such as a forged steel member or segmented and if segmented the segments may be spaced from each other. This may also be true of the construction of the lug means. The axis of the locking member may be at any angle with respect to the axis of rotation of the upper structure so long as the locking member is in "double" shear when certain forces are exerted on the upper structure. The quick disconnect design of the present invention may be of any other design which utilizes the advantages of "double" shear while allowing for quick connection and disconnection of the upper structure with respect to the base. While the bearing and ring gear in the illustrated embodiment is removed with the upper structure, it will be apparent that the invention could be used to provide the disconnect between the upper structure and the bed.

What is claimed is:

1. An apparatus such as a crane having a boom supporting upper structure connected to a bed structure by an annular anti-friction bearing which supports the upper structure for rotation about a generally vertical axis to swing the boom and transmits high radial, axial and moment loads from the upper structure to the bed structure, said bearing having first and second relatively rotatable ring members and anti-friction elements between said members, means for fastening said members to different ones of said structures comprising generally vertical lug means arranged about said axis of rotation and spaced retainer means spaced angularly about said axis for closely receiving said lug means, one of said lug means and retainer means being on one of said members and the other on one of said bed structure and upper structure and a plurality of locking elements spaced angularly about said axis and extending transversely thereof into and between said spaced retainer means and through said lug means for locking said lug means and retainer means against separation, said locking elements being removably received in said retainer means and lug means to permit separation of said bed and upper structures upon removal of the locking elements, and means cooperating with each of said locking elements for releasably securing the elements in a locking position in said retainer and lug means.

2. An apparatus as defined in claim 1 wherein said retainer means comprises spaced plates for receiving said lug means, said plates and lug means having a plurality of apertures for receiving a respective one of said locking elements.

3. An apparatus as defined in claim 2 wherein said lug means has leading chamfer surfaces for guiding said lug means into the receiving space of said retainer means.

4. An apparatus as defined in claim 1 wherein pairs of apertures in said spaced retainer means are in axial alignment with each other to receive said locking elements.

5. An apparatus as defined in claim 1, 2, 3 or 4 wherein said locking element is a bolt having a shank portion and an enlarged head portion at one end thereof and a threaded portion at the other end thereof.

6. An apparatus as defined in claim 1 wherein an opening through said lug for receiving individual ones of said locking elements and locking element receiving apertures in said spaced retainer means are in alignment with each other and lie along an axis which is substantially parallel to the plane of rotation of said bearing.

7. An apparatus as defined in claim 1 wherein said lug means and retainer means have cooperating load supporting surfaces to transmit a downward force from said upper works to said bed.

8. An apparatus as defined in claim 1 wherein said locking elements are slidable in said retainer means and lug means and hydraulic means are provided for operating said locking members between a locking position and a clear position for effecting a connection or disconnection of said lug means and spaced retainer means.

9. A bearing mounting for connecting to a support structure a multiload bearing structure having cooperating race members to transmit relatively high loads between the structures including spaced retainer means extending generally normal to the plane of rotation of the bearing on one of said structures and defining at portions of a channel extending about the bearing axis, lug means on the other of said structures arranged about the axis of the bearing so as to be received in said channel between said spaced retainer means and having spaced apertures each having an axis extending generally transverse to the bearing axis and substantially parallel to the plane of rotation of the bearing, said spaced retainer means having a plurality of pairs of apertures to provide an aligned aperture at each end of said apertures of said lug means, a plurality of locking members extending through respective ones of the aligned apertures to connect said lug means and retainer means and means for releasably holding the locking members in a connecting position and movable to a position permitting connection or disconnection of said lug means and retainer means.

10. A bearing mounting as defined in claim 9 wherein said means releasably holding said locking members comprises an individual hydraulic cylinder connected to one of said spaced retainer means for a plurality of said locking members.

11. A bearing mounting as defined in claim 9 wherein said releasable means comprises hydraulic means for moving said locking elements between a locking position and a position for permitting separation of lug means and spaced retainer means.

12. An apparatus such as a crane having a boom supporting upper structure connected to a bed structure by a bearing which supports the upper structure for rotation about a generally vertical axis to swing the boom and transmits high radial, axial and moment loads from the upper structure to the bed structure, said bearing having first and second relatively rotatable ring members including raceways, means for fastening said members to different ones of said structures comprising generally vertical lug means arranged about said axis of rotation and spaced retainer means for closely receiving said lug means, one of said lug means and retainer means being on one of said members and the other on one of said bed and upper structures and a plurality of locking elements spaced angularly about said axis and extending transversely thereof for locking said lug means and retainer means against separation, said locking elements being movably received in said retainer means and lug means to permit separation of said bed and upper structures upon removal of the locking elements from the lug means, means cooperating with each of said locking elements to hold said elements in a locking position in said retainer means and lug means, said spaced retainer means having pairs of apertures which are in axial alignment with each other to receive said locking elements and said locking elements having a threaded portion, said spaced retainer means further having a threaded fastener connected to one of said spaced retainer means for each of said locking elements with the threaded portion of said locking element being received by the threaded fastener, said threaded portion being of smaller diameter than the body of the locking element received in the spaced retainer means.

13. An apparatus as defined in claim 1, wherein said locking elements lie along lines through the axis of rotation.

14. An apparatus as defined in claim 2 wherein said lug means and retainer means have complementary engaged surfaces which transmit downward forces from said bearing to said bed structure.

15. An apparatus as defined in claim 1, 2, 13 or 14 wherein said retainer means comprises spaced plates through which said locking elements extend and which are curved to define at least portions of a channel extending about said axis of rotation.

16. An apparatus as defined in claim 14 wherein said locking elements lie along lines through the axis of rotation.

* * * * *